United States Patent [19]

Murakami

[11] Patent Number: 4,860,868
[45] Date of Patent: Aug. 29, 1989

[54] AIR PRESSURE CONTROL VALVE OF AN AIR CLUTCH

[75] Inventor: Kiyoharu Murakami, Neyagawa, Japan

[73] Assignee: Kabushiki Kaisha Daikin Seisakusho, Osaka, Japan

[21] Appl. No.: 166,342

[22] Filed: Mar. 10, 1988

[30] Foreign Application Priority Data

Mar. 11, 1987 [JP] Japan .................. 62-56146
Mar. 17, 1987 [JP] Japan .................. 62-61943

[51] Int. Cl.[4] ............................................. F16D 25/14
[52] U.S. Cl. .............................. 192/85 R; 192/109 F; 91/460
[58] Field of Search ............ 192/85 R, 85 AA, 109 F; 91/460, 433, 434, 469

[56] References Cited

U.S. PATENT DOCUMENTS 3,540,558 11/1970 Lamburn .................. 192/85 R
4,479,570 10/1984 Kamio .................. 192/85 AA
4,606,448 8/1986 Kamio .................. 91/434

FOREIGN PATENT DOCUMENTS 61-233223 10/1986 Japan .................. 192/85 R
2060099 4/1981 United Kingdom .................. 91/460

Primary Examiner—Dwight G. Diehl
Assistant Examiner—David A. Testardi
Attorney, Agent, or Firm—Armstrong, Nikaido, Marmelstein, Kubovcik & Murray

[57] ABSTRACT

The present invention is an air control valve of an air clutch wherein an air valve assembly interlocking with an operated quantity of a clutch pedal is provided for controlling an air pressure supplied from an air pressure source to the air clutch. Control mechanism is provided for controlling a valve-open pressure of the air valve assembly by a hydraulic pressure from a master cylinder interlocking with the clutch pedal. The control mechanism includes first, second and third spring members of which spring constants gradually decreases in this order, and the valve-open pressure of the air valve body is adapted to be controlled while switching spring forces of the spring members in accordance with the operated quantity of the clutch pedal.

3 Claims, 4 Drawing Sheets

4,860,868

AIR PRESSURE CONTROL VALVE OF AN AIR CLUTCH

BACKGROUND OF THE INVENTION

Industrial Applicability

The invention relates to an air pressure control valve of an air clutch for controlling the air pressure supplied to the air clutch.

Prior Art and the Problem

A prior art air clutch is constructed as illustrated in FIG. 4.

In FIG. 4, illustrating an air clutch for an automobile, flywheel 10, associated with an engine, to which a clutch cover 12 is fixed to form an annular pneumatic actuator 14 (pneumatic actuator) operable to apply a pressing force to a pressure plate 16 to engage a clutch disc 18 between the pressure plate 16 and the flywheel 10.

The clutch disc 18 is splined to an input shaft 20 of a transmission (not shown) arranged at the output side of the air clutch. A cylindrical shaft 24 is fitted around the shaft 20 through a bushing 22. The clutch cover 12 is fitted around the right end of the cylindrical shaft 24 in FIG. 4.

The left end of the shaft 24 is surrounded by a cover 26, in which a chamber 28 is formed. Two air seals 30a, 30b are interposed between the cover 26 and the shaft 24 to prevent leakage of the air, as will be detailed later.

The cover 26 is connected to a control valve 32 or inching valve, which is adapted to be operated by a clutch pedal 31 and to flow the air supplied from a compressor 34 through a regulator valve 36, a chamber 38 between the air seals 30a, 30b, and an inlet port 40 of the shaft 24 into a passage 42. The left end of the passage 42 is connected through an outlet port 44 and a passage 46 formed in a wall of the clutch cover 12 to an air chamber 48 in the pneumatic actuator 14.

In this known structures, the control valve 32 is connected to the clutch pedal 31 through a rod, and the clutch can not be operated by a hydraulic pressure from a master cylinder.

Further, a pressure control valve may be used as the control valve 32, in which case it is impossible to obtain such a usual pedal operation feeling that the force for operating the clutch pedal 31 gradually increases as the operation (stepped-on) quantity of the pedal 31 increases, resulting in difficulty in the clutch operation or manipulation.

Objects of the Invention

A first object of the invention is to provide an air pressure control valve of an air clutch in which an air pressure supplied to the air clutch can be controlled by a hydraulic pressure from a master cylinder, the clutch can be easily operated, and its axial length is so short that it can be easily mounted on an automobile.

Other and further objects and advantages of the invention will appear more fully from the following description of the embodiments.

Summary of the Invention (1) Technical Means

The present invention provides an air pressure control valve of an air clutch wherein an air valve assembly interlocking with an operated quantity of a clutch pedal for controlling an air pressure supplied from an air pressure source to the air clutch, and a first valve body for supplying the air pressure from the air pressure source to the air clutch when the clutch is engaged and a second valve body interlocking with the clutch pedal for releasing the air pressure to be supplied to the air clutch when the clutch is disengaged are provided in the air valve assembly; characterized in that a first spring member is provided in a cylindrical body fixed to the air valve assembly, the spring force of the first spring member and a pneumatic force against a diaphragm connected to the second valve body are operable to set a maximum air pressure, a rod related to the second valve body is slidably disposed in the cylindrical body, the rod is connected to a piston for receiving a hydraulic force from a master cylinder which transform the operated quantity of the clutch pedal into the hydraulic force, second and third spring members operating in series are concentrically disposed between the rod and the second valve body, a spring force transmitting mechanism is arranged for transmitting the spring force of the second and third spring members to the second valve body, and air pressure characteristics suitable for clutch controlling is obtained by a position of the piston slided by the hydraulic pressure from the master cylinder interlocking with the clutch pedal.

(2) Operation

In the stepped-on operation of the clutch pedal, as the hydraulic pressure against the piston increases, the force against the second valve body by the spring force transmission mechanism decreases, so that such air pressure characteristics are obtained that the air pressure to the air clutch gradually decreases.

Since the spring force transmission mechanism has a short axial length due to the concentrically arranged second and third spring members, the whole length of the air control valve is short, which facilitates mounting thereof to automobiles.

Brief Description of the Drawings

FIG. 2 is a graph illustrating air pressure characteristics in the embodiment of FIG. 1a;

Embodiments (1) First embodiment in FIG. 1 illustrating an air pressure control valve according to a first embodiment of the invention. Portions bearing same reference numerals in FIG. 1 as those in FIG. 4 are identical or similar to those in FIG. 4.

In FIG. 1, an air pressure control valve (inching valve) is provided at the left portion with an air valve assembly 54 (main part) and at the right portion with a control mechanism 56, which are adapted to control an air pressure supplied from a passage 55 in the assembly 54 to the air clutch. The control mechanism 56 is constituted of a hydraulic chamber 59, to which a hydraulic pressure from a master cylinder 58 interlocking with a clutch pedal 57 is supplied, and a spring part 60, which reduces a spring force thereof in accordance with the increase of the hydraulic pressure in the chamber 59, as will be detailed later.

Figure 1:
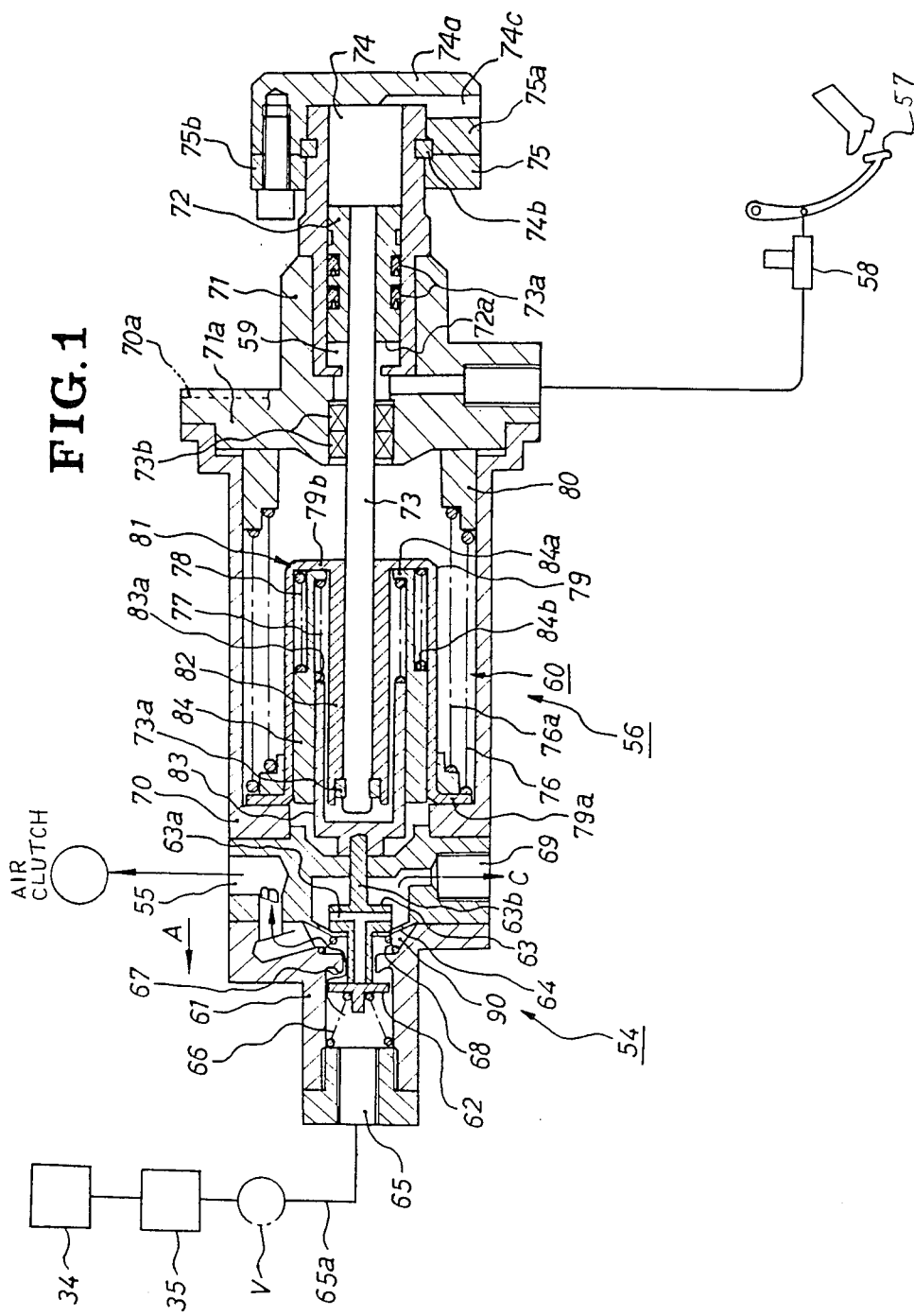
FIG. 1 is a longitudinal sectional view illustrating an air pressure control valve employing a first embodiment of the invention.

The air valve assembly 54, which is same as the know assembly, comprises a body or case 61, a first valve body 62, a second valve body 63 and a diaphragm 64. The case 61 is provided at the left end with an open passage 65, which connects through a pipe 65a to a compressor 34 and a tank 35. The first valve body 62 is biased by a compressible coil spring 66 against a valve seat 67. As will be detailed later, when the second valve body 63 is pushed in a direction of an arrow A by the spring force of the spring part 60 the first valve body 62 opens to flow the compressed air from the compressor 34 in a direction of an arror B for engaging the air clutch.

The second valve body 63 is provided with an internal passage 63a and is connected to the diaphragm spring 64 biased by a compressible coil spring 68 in a direction opposite to the arrow A. A vent 69 is connected to the atmosphere. Thus, when the pressure excessively increases, the diaphragm 64 pushes the second valve body 63 oppositely to the arrow A to separate and open the bodies 62, 63 from each other, so that the air for the air clutch is partially vented through the vent 69 as indicated at an arrow C.

The body 61 is in close contact at the right end surface thereof with a cylindrical body 70 accommodating the spring part 60. The body 70 is fixed at the right end surface to a cylinder 71, in which a cylindrical piston 72 or slave piston is slidably fitted. At 70a is indicated an air vent for a brake oil.

A rod 73 penetrates and is slidably fitted into a partition 71a of the cylinder 71, and is fixed at the right end thereof to the piston 72. At 73a is indicated a seal.

The cylindrical piston 72 is faced at the right end surface in chamber 74, in which the piston 72 can slide. The right end of the chamber 74 is closed by a cover 74a which is fixed to the cylinder 71 by rings 75, 75a connected together by bolts 75b with split rings 74b therebetween. The chamber 74 is vented through a passage 74c.

The spring part 60 includes first springs 76, 76a or spring members, disposed in the cylindrical body 70, a second spring 77 or spring member and a third spring 78 or spring member. The first springs 76, 76a disposed at a radially outermost position are interposed between a flange 79a of a spring seat 79 (detailed later) and a spring seat 80 pressed onto the partition 71a of the cylinder 71, and are substantially extended at the illustrated valve-open condition. The springs 76, 76a have large spring constants so that they may set a maximum air pressure at the clutch engaged condition, in which the hydraulic pressure does not act at the hydraulic chamber 59.

The second and third springs 77, 78 are concentrically held and arranged to operate in series. The force of them is transmitted to a rod 63b of said second valve body 63 through a spring force transmission mechanism 81, which includes a first, second and third cylindrical shaft 82, 83 and 84 as well as the spring seat 79. The first shaft 82 is disposed at the left end of the rod 73 provided with a split ring 73a or stopper ring. When the rod 73 is moved oppositely to the direction A by the hydraulic pressure in the chamber 59, the shaft 82 moves together with the rod 73 to contact and push the flange 79b of the spring seat 79 in the same direction.

The second cylindrical shaft 83 is slidably fitted around the first shaft 82 and is connected at the left end to the rod 63b. The second spring 77 is disposed between the end surface 83a thereof and a flange 84a of the third shaft 84, and is substantially fully compressed in the illustrated valve-open condition.

The second spring 77 has a spring constant which is smaller than those of the first springs 76, 76a and is larger than the third spring 78. The relatively strong second spring 77 is preferably arranged at the radially inner position, so that an intended characteristic can be easily set at the second spring 77.

A third cylindrical shaft 84 having a stepped portion 84b is axially slidably fitted around the second cylindrical shaft 83. The third spring 78 is disposed between the stepped portion 84b and the flange 79b. This third spring 78 is also substantially fully compressed at the valve-open condition, as the second spring 77 is, and the flange 79b directly contacts and pushes the flange 84a.

As described above, the first springs 76, 76a have the largest spring constants, the second spring 77 has the middle spring constant, and the third spring has the smallest spring constant.

An operation is as follows. In the clutch engaged condition in FIG. 1, it is apparent that the clutch pedal 57 is not operated, and the hydraulic pressure is not applied to the chamber 59. Thus, the piston 72 is pulled oppositely to the direction A by the spring force applied through the rod 73 from the mechanism 81 to slide to the left end. In this condition, the spring force of the first springs 76, 76a overcomes that of the second and third springs 77, 78 and functions to push the second shaft 83 in the direction of the arrow A and to contact it with the rod 63b, and thus, the second valve body 63 is pressed against the first valve body 62.

The second valve body 63 is pushed oppositely to the direction A by the pressure in the chamber 90 acting on the diaphragm 64. When the pneumatic force in the chamber 90 applied to the second valve body 63 oppositely to the direction A overcomes the biasing elastic force to the second shaft 83 by the first spring 76, 76a, the second valve body 63 moves away from the first valve body 62 to open the valve, so that the compressed air is partially vented to the atmosphere as shown by the arrow C to control the pneumatic pressure to be supplied from the passage 55 to the air clutch.

Figure 2:
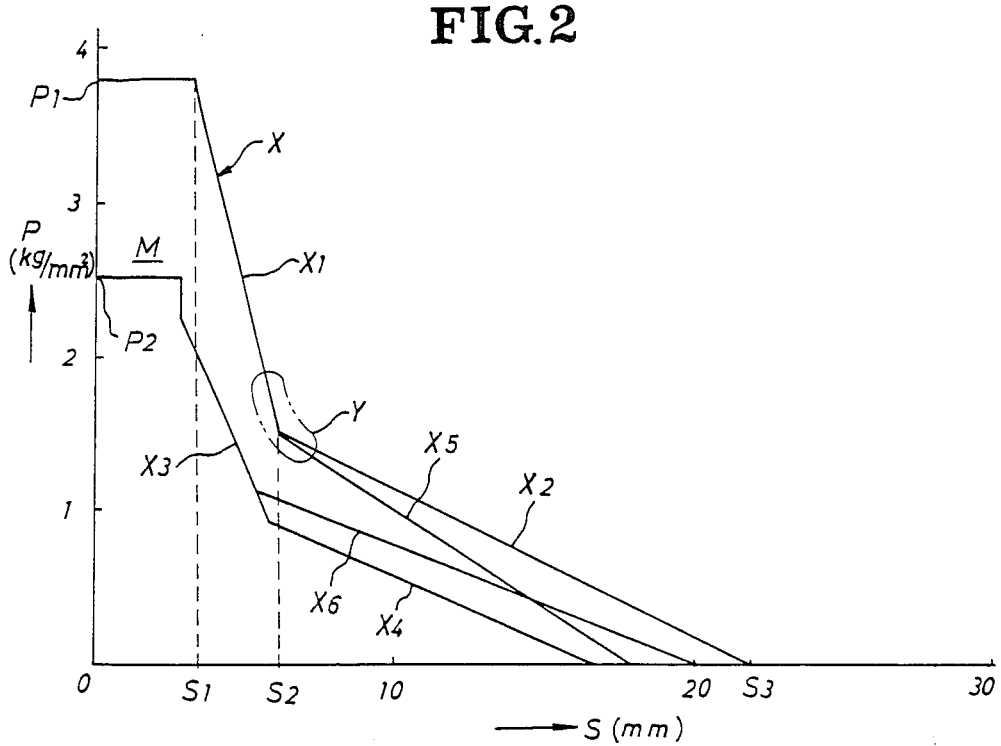

By virtue of the pressure control operation in the clutch engaging operation by the first springs 76, 76a, the maximum air pressure P1 is determined in the characteristics in FIG. 2, which is a graph of the air pressure P in the passage 55 and a stroke S of the piston 72 interlocking with the clutch pedal 57. Therefore, it is not necessary to provide a conventional regulator valve V at the pipe 65a.

As the clutch pedal 57 is depressed to disengage the clutch, the hydraulic pressure gradually increases in the chamber 59 and the piston 72 is pushed at the pressure receiving surface 72a oppositely to the direction A. When the hydraulic force in the chamber 59 overcomes the spring force of the springs 76, 76a to move the piston 72 to the right, the spring force of the first springs 76, 76a is cancelled by the hydraulic force applied to the surface 72a. Then the second spring 77 extends and elastically forces the second shaft 83 to push the rod 63b.

During this operation of the second spring 77, a relatively rapid characteristic X1 is generated in a range between S1 and S2 in the characteristics X in FIG. 2.

When the clutch pedal 57 is further depressed, the hydraulic pressure in the chamber 59 further increases, and the piston 72 further slides right. The, the second spring 77 almost fully extends, and the third spring 78 elastically pushes the second shaft 83 against the second valve body 63. In this condition, a slow characteristic X2 is generated in a range between S2 and S3 in FIG. 2. When the clutch pedal 57 is depressed to S3, the piston 72 moves to the right end and the air clutch is disengaged.

As described above, because the first springs 76, 76a, the second spring 77 and the third spring 76, of which spring constants decreases in this order, are activated in accordance with the depression of the clutch pedal 57, the clutch can be engaged in accordance with the characteristics shown in FIG. 2 having the characteristic X2 in the range S2-S3, in which P gradually increases, an ara Y at the vicinity of S2, in which both of the first and second springs 76, 76a and 77 operate, and the characteristic X in which the air pressure P rapidly increases to the maximum pressure P1, at which the air clutch is fully engaged.

Therefore, the disadvantage, in air clutches employing conventional pressure control valves, of suddenly engaging or disengaging in accordance with a short stroke S of the clutch pedal 57, is prevented.

Further, the spring constants of the first springs 76, 76a can be adjusted to decrease the maximum air pressure P1 to P2, and the spring constants and others of the second and third springs 77 and 78 can be adjusted to selectively achieve various characteristics X3-X6 in an adjustable range M.

Figure 3:
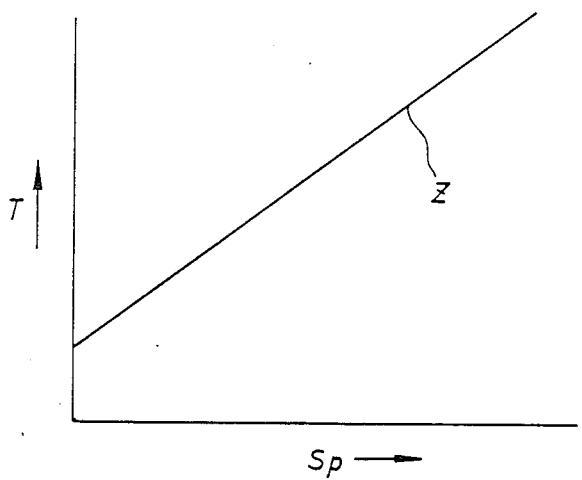
FIG. 3 is a graph illustrating characteristics of a stepping force onto a pedal.

Further, by virtue of the spring force of the first springs 76, 76a, the stepping force on the clutch pedal 57 shows characteristics Z linearly increasing in accordance with the increase of the stroke S as shown in FIG. 3, which is a graph of the stroke Sp and the stepping force T of the clutch pedal 57. Therefore, the driver can have a natural clutch operation feeling in which the stepping force increases as the stepped quantity of the clutch pedal 57 increases.

Effect

As described hereinbefore, in the air pressure control valve of the air clutch according to the first embodiment of the present invention, there is provided a control mechanism 56 for controlling the opening and closing operation of the second valve body 63. The control mechanism 56 is constituted by the hydraulic chamber 59, which is connected to the clutch master cylinder 58, transforming the stepped-on quantity of the clutch pedal 57 into the hydraulic force. The spring part 60 generates biasing force for opening the second valve body 63 in accordance with the pressure in the hydraulic chamber 59. The cylindrical piston 72, having the pressure receiving surface 72a faced to said hydraulic chamber 59, is slidably fitted in the cylinder 71 of the spring part 60. The first springs 76, 76a (first spring members) are arranged for biasing the cylindrical piston 72 against the hydraulic force on the pressure receiving surface 72a and for determining the maximum air pressure. The rod 73, related to said second valve body 63, is slidably arranged in the cylindrical body 70 and is connected to the cylindrical piston 72 receiving the hydraulic force from the clutch master cylinder 58 for transforming the stepped-on quantity of the clutch pedal 57 into hydraulic force. The second and third springs 77, 78 (second and third members), operating in series, are concentrically arranged between the rod 73 and the second valve body 63. The spring force transmitting mechanism 81 is arranged for transmitting the spring force of the second and third springs 77, 78 to the second valve body 63. The biasing force of the second cylindrical shaft 83 is gradually reduced so that the air pressure characteristics suitable for the clutch controlling may be obtained by the position of the cylindrical piston 72 slided by the hydraulic pressure from the clutch master cylinder 58 interlocking with the clutch pedal 57. Therefore, following effects can be achieved.

The air pressure control valve can be mounted on the automobiles having the ordinary master cylinder 58, without connecting the clutch pedal 57 to the air pressure control valve by a rod. Further, although the second and third springs 77 and 78 are concentrically overlapped and held by the spring force transmission mechanism 81, the spring forces operate in series by virtue of the spring force transmission mechanism 81, so that the control part 56 has a shorter length than the conventional control parts, resulting in short length of the whole air pressure control valve. Thus, it can be easily mounted on the automobiles.

The clutch can be engaged in accordance with the characteristics shown in FIG. 2 having the characteristic X2 in the range S2-S3, in which P gradually increases, an area Y at the vicinity of S2, in which both of the second and third springs 77, 78 operate, and the characteristic X in which the air pressure P rapidly increases to the maximum pressure P1, at which the air clutch is fully engaged. Therefore, such a disadvantage, which may be cancelled in air clutches employing conventional pressure control valves, can prevent the air clutch from suddenly engage or disengage in accordance with a short stroke S of the clutch pedal 57.

Further, by virtue of the spring force of the first springs 76, 76a, the stepping force on the clutch pedal 57 shows characteristics Z linearly increasing in accordance with the increase of the stroke S as shown in FIG. 3, graphically showing the stroke Sp and the stepping force T of the clutch pedal 57. Therefore, the driver can have a natural clutch operation feeling in which the stepping force T increases as the stepped quantity of the clutch pedal 57 increases.

(2) Second Embodiment

In the air pressure control valve of an air clutch in the second embodiment of the invention, an air valve assembly, interlocking with an operated quantity of a clutch pedal, is provided for controlling an air pressure supplied from an air pressure source to the air clutch, and a first valve body for supplying the air pressure from the air pressure source to the air clutch, when the clutch is engaged, and a second valve body interlocking with the clutch pedal for releasing the air pressure to be supplied to the air clutch when the clutch is disengaged, are provided in the air valve assembly and is characterized in that a piston is slidably arranged in a cylindrical fixed to an end surface of the air valve assembly, a hydraulic chamber connected to a master cylinder, interlocking with the clutch pedal, is formed between this piston and the cylinder, a rod penetrating the air valve assembly is fixed to the piston, a cylindrical body is fixed to the other end surface of the air valve assembly, a first balance piston is slidably arranged in the cylindrical body, a second valve body, closely contacting the first valve body, is arranged at one end surface of the first balance piston, a cylindrical projection is formed on the other end surface of the first balance piston, a second balance piston slidable to the cylindrical body is arranged at the end of such cylindrical projection, an air chamber is formed between the second balance piston and an end cover of the cylindrical body and is provided with an air passage to which compressed air to be supplied to the air clutch is introduced. The cylindrical projection includes a long aperture having a predetermined length. A pin fixed to the end of the rod is fitted into the long aperture. A first spring member, operating against the hydraulic force from the hydraulic chamber and second and third spring members setting a valve-opening pressure of the second valve body are arranged between the cylindrical body and the rod. The first, second and third spring members are concentrically disposed to operate in series. A spring force transmission mechanism is arranged for transmitting the spring force of the second and third spring members to said second valve body. Air pressure characteristics suitable for clutch controlling is obtained by a position of the piston slided by the hydraulic pressure from the master cylinder interlocking with the clutch pedal.

In the structures, in the stepping-on operation of the clutch pedal, as the hydraulic pressure against the piston increases, the biasing force transmitted to the second valve body, through the first balance piston from the spring force transmission mechanism, decreases, so that such air pressure characteristics are obtained that the air pressure to the air clutch gradually decreases.

Because the spring force transmission mechanism has a short axial length, due to the concentrically arranged first, second and third spring members, the whole length of the air pressure control valve is short, which facilitates mounting thereof in the automobiles.

Figure 1A:
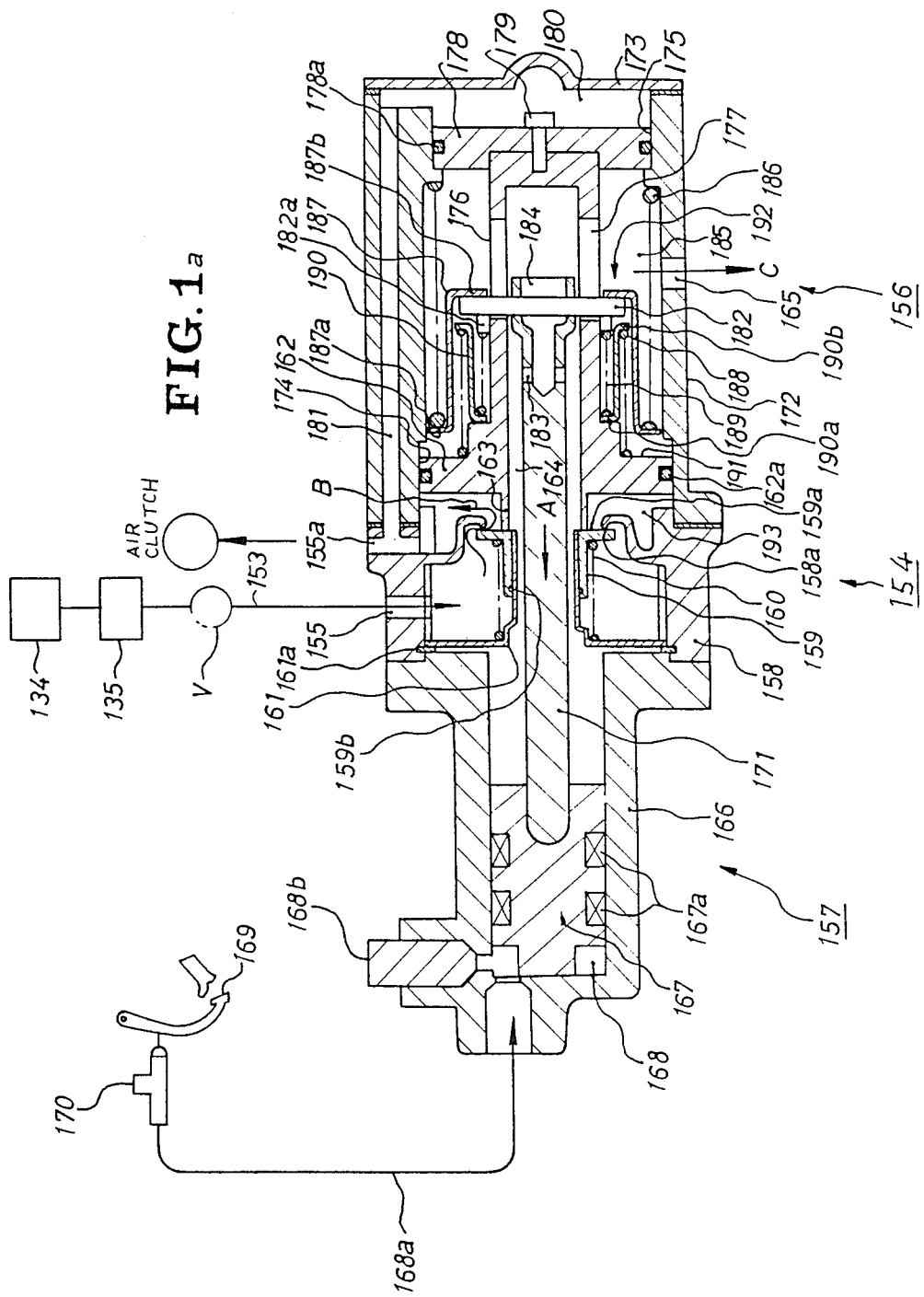
FIG. 1a is a longitudinal sectional view illustrating an air pressure control valve employing a second embodiment of the invention.
Figure 4:
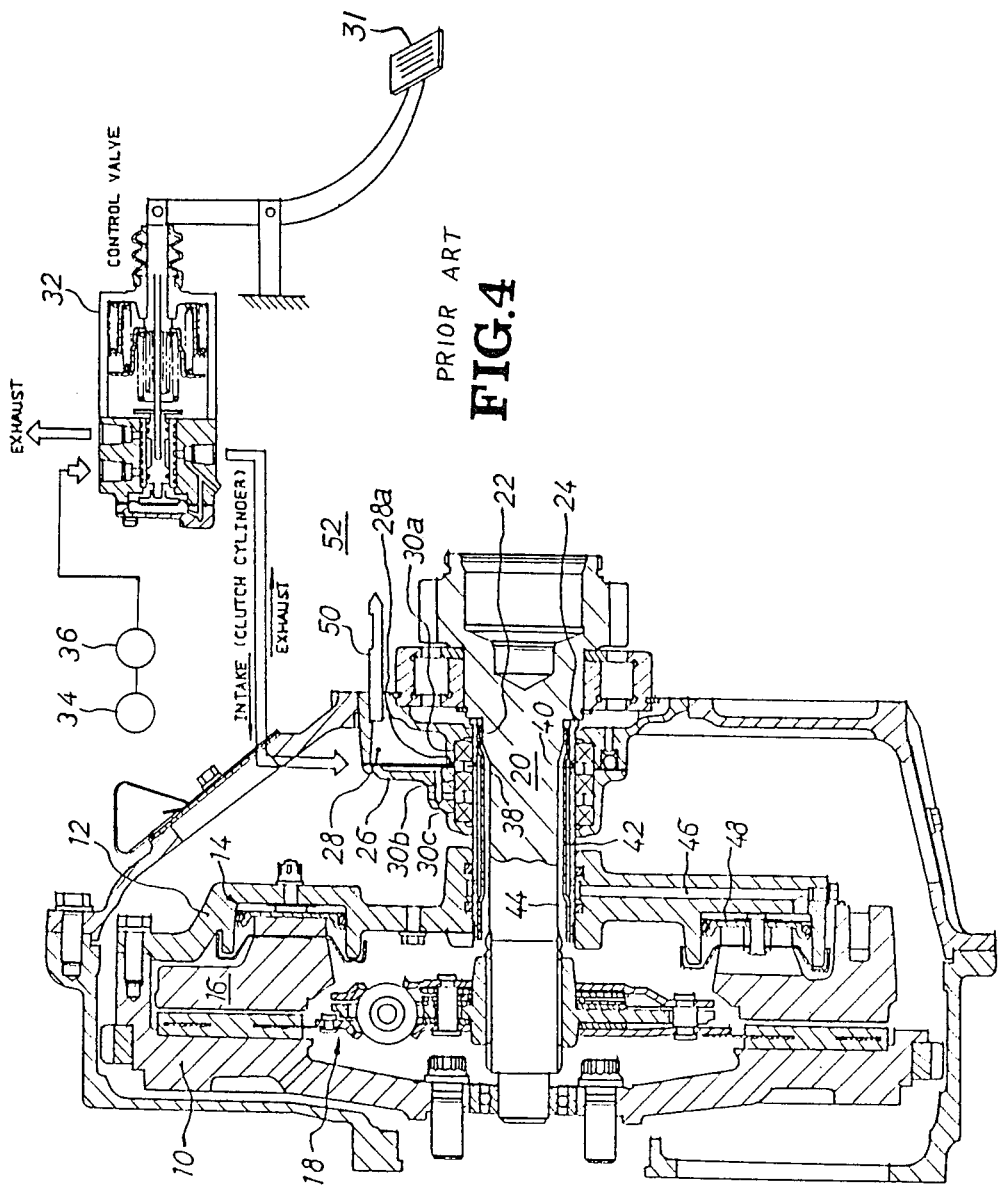
FIG. 4 is a structural schematic view of a prior art air clutch.

FIG. 1a illustrates an air pressure control valve according to the second embodiment of the invention. Portions bearing same reference numerals in FIG. 1a as those in FIG. 4 are identical or similar to those in FIG. 4.

In FIG. 1a, an air pressure control valve (inching valve) is provided at the middle, right and left portions with an air valve assembly 154 (main part). A control mechanism 156 and a hydraulic mechanism 157, respectively, are adapted to control and supply an air pressure from a passage 155 in the assembly 154 through a passage 155a to the air clutch. The passage 155 is connected to a passage 153 provided with a compressor 134 and an air tank 135.

The air valve assembly 154 comprises a body or case 158, a first valve body 159, a compressible coil spring 160, and a valve guide 161. The substantially cylindrical case 158 has an inner peripheral surface continuous to a valve seat 158a, and a first valve body 159 is seated on or leaves the seat 158a to open or close the valve.

The valve guide 161 is of a substantially cylindrical shape and is disengageably connected to the case 158 by a snap ring 161a. The first valve body 159 is air-tightly and slidably arranged on the outer peripheral surface on the valve guide 161 with a seal ring 159 therebetween. The coil spring 160 is interposed between the first valve body 159 and the valve guide 161 for elastically pressing a surface 159a against the valve seat 158a.

A second valve body 163 of a first balance piston 162, which will be detailed later, is pressed onto the inner peripheral portion of the right end surface of the pressing surface 159a, so that the body 163 may bias the surface 159 in a direction of an arrow A. Thus, when the valve body 163 leaves the surface 159a, the compressed air to be supplied from the passage 155a to the air clutch is partially discharged to the passage 164, and is vented through a port 165 of the control mechanism 156 as indicated at an arrow C.

The hydraulic control mechanism 157 includes a hydraulic chamber 168, which is formed between a cylinder 166 fixed to the left end in FIG. 1a of the case 158 and a piston 167, and is connected through a pipe 168a to master cylinder 170 which transforms an operated quantity of a clutch pedal 169 into a hydraulic force. The hydraulic pressure in the chamber 168 increases in accordance with the operated quantity of the clutch pedal 169, and the piston 167 slides oppositely to the arrow A. At 168b and 167a are indicated an air vent and a seal, respectively.

The piston 167 is fixed at the right end central portion to a rod 171 which extends through the valve guide 161 toward the control mechanism 156 to connect the control mechanism 156 and the hydraulic mechanism 157 together.

The control mechanism 156 includes a cylindrical body or case 172 fixed to the right end surface of the case 158. The right end of the case 172 is closed by an end cover 173. The case 172 is provided at opposite ends of the inner peripheral surface with slide surfaces 174, 175. The left slide surface 174 slidably carries the first balance piston 162 through a seal ring 162a. The left end surface of this piston 162 continues to the second valve body 163. The right end surface of the first balance piston 162 continues to a cylindrical projection 176, which extends toward the right and is provided at the intermediate portion with a longitudinally extending aperture 177.

A second balance piston 178 is fixed to the right end of the projection 176 by a bolt 179, and is slidably fitted to the slide surface 175 through a seal ring 178a. An air chamber 180 between this second balance piston 178 and the end cover 173 is connected to said passage 155a through a passage 181 formed in a wall forming the case 172.

A pin 182 longitudinally and fixedly penetrates the right end of said root 171, and extends through the long aperture 177. The rod 171 is provided at the right end with an aperture 183 and a passage 184, which connect the passsage 164 and the chamber 185 together through the long aperture 177.

A right end of a first spring 186 or spring member is pressed onto the inner peripheral surface of the right end of the cylindrical body 172. The left end of the first spring 186 is pressed onto a flange 187a of a spring seat 187. A flange 187b of a spring seat 187 of a substantially cylindrical shape is pressed onto the pin 182 to transmit the spring force of the first spring 186 acting in the direction of the arrow A through a spring seat 187 to the rod 171.

At radially inside the first spring 186 is arranged a third spring 188 or spring member and a second spring 189 or spring member. The second spring 189 is pressed at the right end against a spring seat 182a of the pin 182 and is pressed at the left end against a flange 190a of a spring seat 190. The third spring 188 is pressed at the right end against a flange 190b of the spring seat 190 of a substantially cylindrical shape and is pressed against the end surface 191 of the first balance piston 162.

The spring constant of the first spring 186 is larger than those of the other springs so as to determine a maximum air pressure when the hydraulic pressure does not act on the first valve body 159 in the clutch disengaged condition. The second spring 189 has a spring constant larger than that of the third spring 188.

Therefore, the spring seats 187, 190 form a spring force transmission mechanism 192 to concentrically hold the third and second springs 188 and 189 and to act with them in series.

An operation is as follows. In the clutch engaged condition in FIG. 1a, it is apparent that the clutch pedal 169 is not operated, and the hydraulic pressure is not applied to chamber 168. Thus, the piston 167 is pushed oppositely to the direction A by the spring force of spring 186 applied through the rod 171 from the mechanism 192 to slide to the left end. In this condition, the spring force of the first springs 186 overcomes that of the second and third springs 189, 188 and functions through the spring seat 187 and the pin 182 to push the rod 171 in the direction of the arrow A.

Simultaneously, the spring force of the first spring 186 is transmitted through the second spring 189, spring seat 190 and third spring 188 to the first balance piston 162, the second valve body 163 pushes the pressing surface 159a in the valve opening direction of the arrow A to leave it from the valve seat 158a, and the air supplied to the passage 155 flows to the passage 155a.

When the pressure in a chamber 193 connected to the passage 155a increases excessively, the second valve body 163 pushed oppositely to the arrow A by the pressure in the chamber 193 leaves the pressing surface 159a, and the compressed air in the chamber 193 is partially vented to the atmosphere as shown by the arrow C from the port 165 through the passage 164, aperture 183, passage 184, long aperture 177 and chamber 185 to control the pneumatic pressure to be supplied from the passage 155a to the air clutch.

By virtue of the pressure control operation in the clutch engaging operation by the first spring 186, the maximum air pressure P1 is determined in the characteristics in FIG. 2, which is a graph of the air pressure P in the passage 55 and a stroke S of the piston 167 interlocking with the clutch pedal 167. Therefore, it is not necessary to provide a conventional regulator valve V at the passage 153.

When the clutch pedal 169 is depressed to disengage the clutch, the hydraulic pressure gradually increases in the chamber 168 and the piston 167 is pushed oppositely to the direction A. When the hydraulic force in the chamber 168 transmitted through the rod 171 and the pin 182 to the spring seat 187 overcomes the spring force of the first spring 186 to move the piston 167 right, the spring force of the first spring 186 is cancelled by the hydraulic force in the chamber 168, so that the second spring 189 elastically pushes the first balance piston 162 in the direction A to press the second valve body 163 against the surface 159a.

During this operation of the second spring 189, a relatively rapid characteristic X1 is generated in a range between S1 and S2 in the characteristics X in FIG. 2.

When the clutch pedal 169 is further depressed, the hydraulic pressure in the chamber 168 further increases, and the piston 167 further slides right. Then, the second spring 189 almost fully extends, and the third spring 188 elastically pushes the second valve body 163 of the first balance piston 162 against the pressing surface 159a. In this condition, a slow characteristic X2 is generated in a range between S2 and S3 in FIG. 2. When the clutch pedal 169 is more fully depressed to S3, the piston 167 moves to the right end and the air clutch is disengaged.

When the clutch pedal 169 is depressed as described before, following relation can be established, in which Am is an effective area of the first balance piston 162, Bm is an effective area of the second balance piston 178, Pa is a pressure in the chamber 193, W1 is a spring force of the first spring 186, W2 is a spring force of the second spring 189 and W3 is a spring force of the third spring 188:

$$Pa \times (Am - Bm) = W1 - W2 - W3 \quad (1)$$

The first balance piston 162 is balanced, the second valve body 163 switches the open and closed condition of the pressing surface 159a, and it is balanced at the pressure to the operated position or quantity of the clutch pedal 169.

As described above, because the first spring 186, the second spring 189 and the third spring 188, of which spring constants decreases in this order, are activated in accordance with the depression of the clutch pedal 169, the clutch can be engaged in accordance with the characteristics shown in FIG. 2 having the characteristic X2 in the range S3-S2, in which P gradually increases, an area Y at the vicinity of S2, in which both of the first and second springs 186, 189 operate, and the characteristic X in which the air pressure P rapidly increases to the maximum pressure P1, at which the air clutch is fully engaged.

Therefore, the disadvantage, in air clutches employing conventional pressure control valves, of suddenly engaging or disengaging in accordance with a short stroke S of the clutch pedal 169, is prevented.

Further, the spring constants of the first spring 186 can be adjusted to decrease the maximum air pressure P1 to P2, and the spring constants and others of the second and third springs 189, 188 can be adjusted to selectively achieve various characteristics X3-X6 in an adjustable range M.

Further, by virtue of the spring force of the first spring 186, the stepping force on the clutch pedal 169 shows characteristics Z linearly increasing in accordance with the increase of the stroke S as shown in FIG. 3, graphically showing the stroke Sp and the stepping force T of the clutch pedal 169. Therefore, the driver can have a natural clutch operation feeling in which the stepping force T increases as the stepped quantity of the clutch pedal 169 increases.

Effect

As described hereinbefore, in the air pressure control valve of the air clutch according to the second embodiment of the present invention, it is characterized in that the piston 167 is slidably arranged in the cylindrical cylinder 166 fixed to an end surface of the air valve assembly 154. A hydraulic chamber 168 connected to a master cylinder 170 interlocking with the clutch pedal 169 is formed between this piston 167 and the cylinder 166. A rod 171 penetrating the air valve assembly 154 is fixed to the piston 167. A cylindrical body 172 is fixed to the other end surface of the air valve assembly 154. A first balance piston 162 is slidably arranged in cylindrical body 172. A second valve body 163 closely contacting the first valve body 159 is arranged at one end surface of the first balance piston 162. A cylindrical projection 76 is formed on the other end surface of the first balance piston 162. A second balance piston 178 slidable to the cylindrical body 172 is arranged at the end of cylindrical projection 176. An air chamber 180 is formed between the second balance piston 178 and an end cover 173 of the cylindrical body 172 and is provided with an air passage 181 to which compressed air to be supplied to the air clutch is introduced. The cylindrical projection 176 includes a long aperture 177 having a predetermined length. A pin 182 fixed to the end of said rod 171 is fitted into the long aperture 177. A first spring 186 operating against the hydraulic force from the hydraulic chamber 168 and second and third springs 189, 188 setting a valve-opening pressure of the second valve body 163 are arranged between the cylindrical body 172 and the rod 171. The first, second and third springs 186, 189, 188 are concentrically disposed to operate in series. A spring force transmission mechanism 192 is arranged for transmitting the spring force of the second and third springs 189, 188 to the second valve body 163. Air pressure characteristics suitable for clutch controlling is obtained by a position of the piston 167 slided by the hydraulic pressure from the master cylinder 170 interlocking with the clutch pedal 169. Therefore, following effects can be achieved.

The air pressure control valve can be mounted on the automobiles having the ordinary master cylinder 170, without connecting the clutch pedal 169 to the air pressure control valve by a rod. Further, although the second and third springs 189, 188 are concentrically overlapped and held by the spring force transmission mechanism 192, the spring forces operate in series by virtue of the spring force transmission mechanism 192. Thus, the control mechanism 156 has a shorter length than the conventional mechanism, resulting in short length of the whole air pressure control valve. Thus, it can be easily mounted on the automobiles.

The clutch can be engaged in accordance with the characteristics shown in FIG. 2 having the characteristic X2 in the range S2-S3, in which P gradually increases, an area Y at the vicinity of S2, in which both of the first and second springs 186, 189 operate, and the characteristic X in which the air pressure P rapidly increases to the maximum pressure P1, at which the air clutch is fully engaged. Therefore, sudden engage or disengage with a short stroke S of the clutch pedal 169 as occurs in conventional control valves, is avoided.

Further, by virtue of the spring force of the first spring 186, the stepping force on the clutch pedal 169 shows characteristics Z linearly increasing in accordance with the increase of the stroke S as shown in FIG. 3, graphically showing the stroke Sp and the stepping force T of the clutch pedal 169. Therefore, the driver can have a natural clutch operation feeling in which the stepping force T increases as the stepped quantity of the clutch pedal 169 increases.

I claim:

1. An air pressure control valve for an air clutch wherein an air valve assembly interlocking with the operation of a clutch pedal controls air pressure supplied from an air pressure source to the air clutch, said air valve assembly including a first valve body for supplying air pressure from said air pressure source to said air clutch when said clutch is engaged and a second valve body interlocking with said clutch pedal for releasing said air pressure supplied to said air clutch when said clutch is disengaged characterized by a piston slidably arranged in a cylindrical cylinder fixed to one end surface of said air valve assembly, a hydraulic chamber connected to a master cylinder interlocking with said clutch pedal between said piston and said cylinder, a rod penetrating said air valve assembly fixed to said piston, a cylindrical body fixed to the other end surface of said air valve assembly, a first balance piston slidably arranged in said cylindrical body, said second valve body closely contacting said first valve body and positioned at one end surface of said first balance piston, a cylindrical projection formed on the other end surface of said first balance piston, a second balance piston slidable with respect to said cylindrical body at the end of said cylindrical projection, an air chamber formed between said second balance piston and an end cover of said cylindrical body, said air chamber having an air passage to which compressed air to be supplied to said air clutch is introduced, said cylindrical projection including a long aperture having a predetermined length, a pin fixed to the end of said rod fitted into said long aperture, a first spring member operating against the hydraulic force from said hydraulic chamber and second and third spring members setting a valve-opening pressure of the second valve body positioned between said cylindrical body and said rod, said first, second and third spring members being concentrically disposed to operate in series, a spring force transmission mechanism for transmitting the spring force of said second and third spring members to said second valve body, and air pressure suitable for clutch controlling being obtained by slide positioning said piston with hydraulic pressure from said master cylinder interlocking with said clutch pedal.

2. An air pressure control valve as recited in claim 1 wherein said spring force transmission mechanism includes a first guide connecting an end surface of said first spring member to said pin and a second guide connected to one end surface of said second spring member arranged at a radially inner most position around said cylindrical projection, said second spring having its other end surface pressed against said pin, said one end surface of said second spring member and said second guide being pressed against said first balance piston.

3. An air pressure control valve for an air clutch wherein an air valve assembly interlocking with a clutch pedal controls air pressure supplied from an air pressure source to said air clutch, said air valve assembly having a first valve body for supplying air pressure from an air pressure source to said air clutch when said clutch is engaged and a second valve body interlocking with said clutch pedal for releasing said air pressure supplied to said air clutch when said clutch is disengaged; characterized by an air tank and an air compressor connected to a passage to be selectively opened and closed by said first valve body of said air valve assembly, a control mechanism for controlling the air pressure of said air valve assembly and a hydraulic mechanism interlocking with said pedal disposed adjacent to opposite ends of said air valve assembly, respectively, a piston slidably arranged in a cylindrical cylinder of said hydraulic mechanism fixed to an end surface of said air valve assembly, a hydraulic chamber connected to a master cylinder interlocking with said clutch pedal and formed between said piston and said cylinder, a rod penetrating said air valve assembly fixed to said piston, a cylindrical body fixed to the other end surface of said air valve assembly, a first balance piston slidably arranged in said cylindrical body of said control mechanism, a second valve body closely contacting said first valve body at one end surface of said first balance piston, a cylindrical projection formed on the other end surface of said first balance piston, a second balance piston slidable with respect to said cylindrical body arranged at the end of said cylindrical projection, an air chamber formed between said second balance piston and an end cover of said cylindrical body, said air chamber being provided with an air passage to which compressed air to be supplied to said air clutch is introduced, said cylindrical projection including a long aperture having a predetermined length, a pin fixed to the end of said rod fitted into said long aperture, a first spring member operating against the hydraulic force from said hydraulic chamber and second and third spring members setting a valve-opening pressure of the second valve body and arranged between said cylindrical body and said rod, said first, second and third spring members including coil-like first, second and third springs, respectively, concentrically disposed to operate in series, a spring force transmission mechanism arranged for transmitting the spring force of said second and third spring members to said second valve body, and air pressure suitable for clutch controlling being obtained by slide positioning said piston by said hydraulic pressure from said master cylinder interlocking with said clutch pedal, said spring force transmission mechanism comprising a first guide connecting an end surface of said first spring member to said pin and a second guide, said second guide connected to one end surface of said second spring and arranged at a radially inner most position, the other end surface of said second spring being pressed against said pin, said one end surface of said second spring and said second guide being pressed against said first balance piston.

* * * * *